Dec. 22, 1936.    J. A. MANNING    2,064,933
EYE MOUNTING FOR DOLLS
Filed March 1, 1934    2 Sheets-Sheet 1
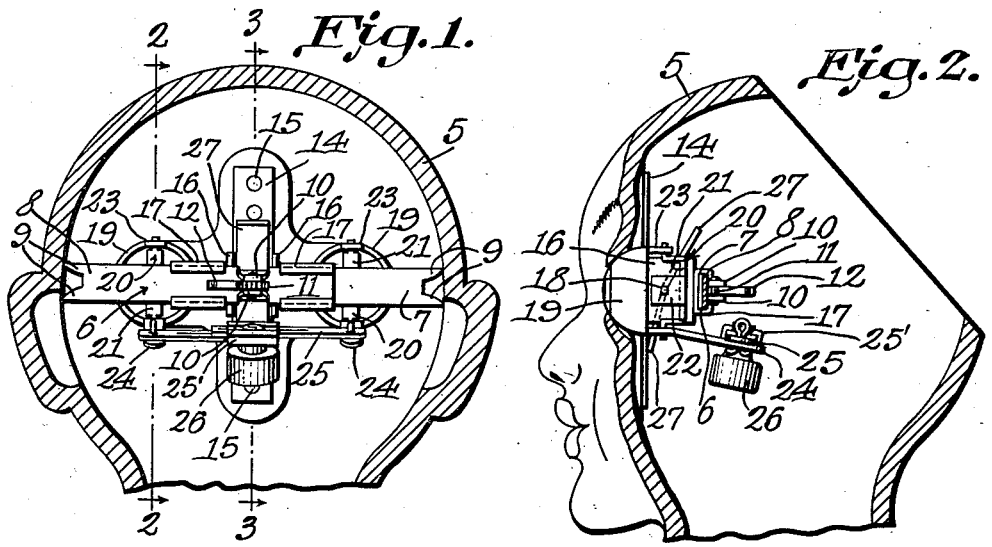
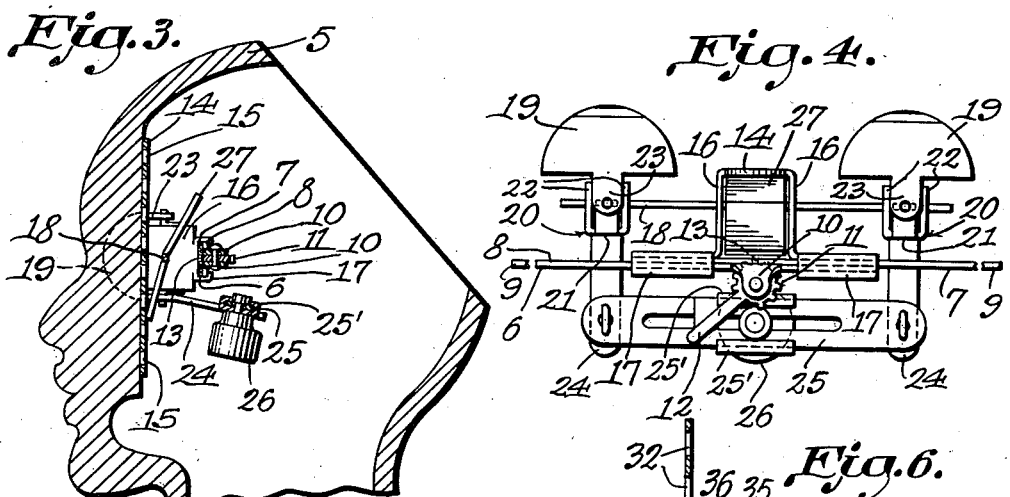
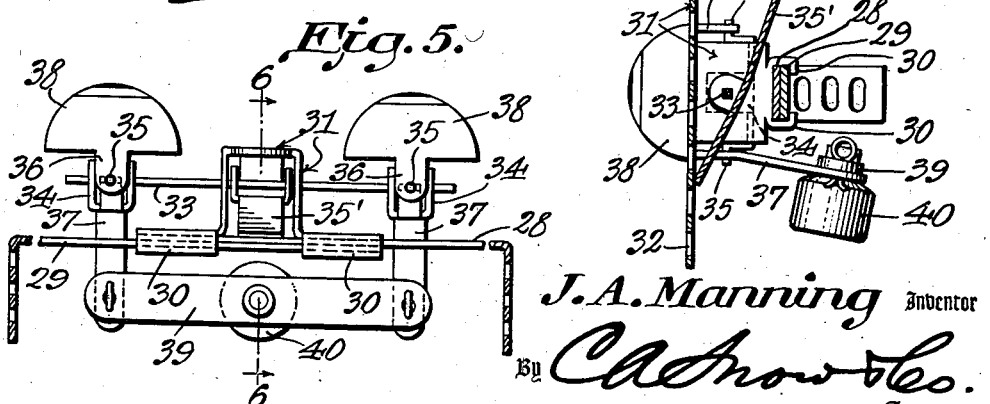
J. A. Manning Inventor Dec. 22, 1936.  J. A. MANNING  2,064,933
EYE MOUNTING FOR DOLLS
Filed March 1, 1934   2 Sheets-Sheet 2
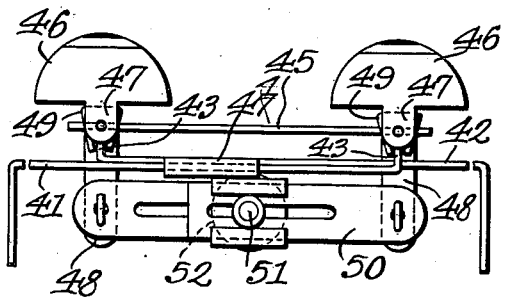
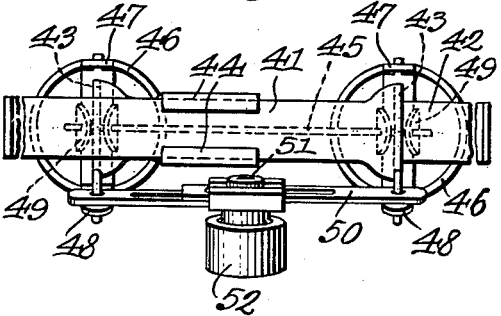
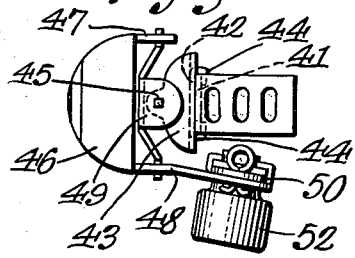
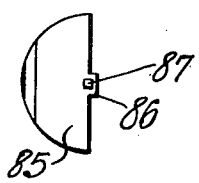
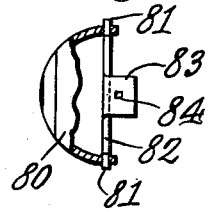
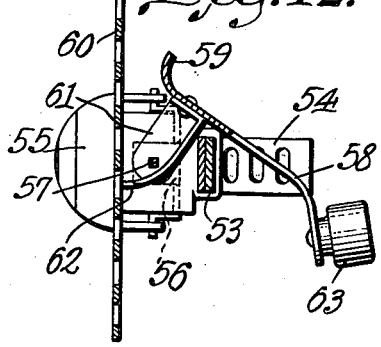
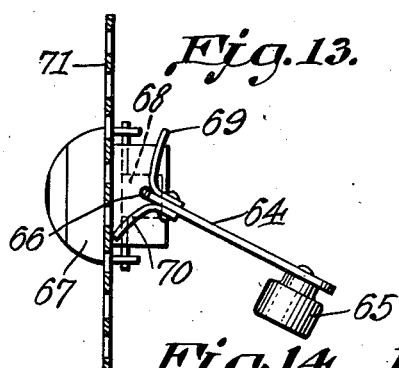
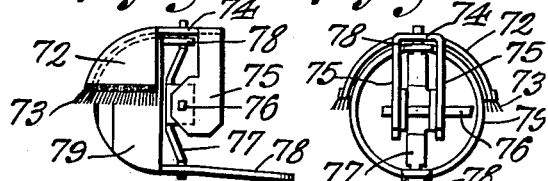

Patented Dec. 22, 1936

2,064,933

UNITED STATES PATENT OFFICE 2,064,933

EYE MOUNTING FOR DOLLS

Joseph A. Manning, Pawtucket, R. I.

Application March 1, 1934, Serial No. 713,561

2 Claims. (Cl. 46—168)

This invention relates to eye mountings for dolls, the primary object of the invention being to provide an eye mounting wherein the eyeballs will move freely with respect to the doll head, simulating the movements of the human eye.

Another object of the invention is to provide an eye mounting which will permit of a lateral movement of the eyeballs resulting in a rolling or glancing movement being imparted to the eyeballs.

A further object of the invention is the provision of a mounting which may be readily adjusted for application to doll heads of various sizes wherein the eye openings or sockets, are various distances apart.

A still further object of the invention is to provide a mounting which will be especially sensitive, and one which will insure movement of the eyeballs, with the slightest movement of the doll head.

With the foregoing and other objects in view, which will appear as the description proceeds, the invention resides in the combination and arrangement of parts and in the details of construction hereinafter described and claimed, it being understood that changes in the precise embodiment of the invention may be made within the scope of what is claimed, without departing from the spirit of the invention.

Referring to the drawings:

Figure 1 is a sectional view through a doll head equipped with an eye mounting constructed in accordance with the invention.

Figure 2 is a sectional view taken on line 2—2 of Figure 1.

Figure 3 is a sectional view taken on line 3—3 of Figure 1.

Figure 4 is a plan view of the device.

Figure 5 illustrates a plan view of a modified form of the invention.

Figure 6 is a sectional view taken on line 6—6 of Figure 5.

Figure 7 is a plan view of a further modified form of the invention.

Figure 8 is a rear elevational view thereof.

Figure 9 is an end elevational view of the modified form of the invention illustrated by Figures 7 and 8.

Figure 10 is a modified form of one of the eye members.

Figure 11 is a further modified form of one of the eye members, the eye member being partly broken away illustrating the supporting means for the eye member.

Figure 12 is a vertical sectional view through another modified form of the invention.

Figure 13 is a vertical sectional view through a still further modified form of the invention.

Figure 14 is an elevational view illustrating an eye member as movable within an eyelid section.

Fig. 15 is a rear elevational view thereof.

Referring to the drawings in detail, the reference character 5 indicates a doll head, which is of the usual and well known construction, the doll head being formed with eye sockets or openings.

The mounting, forming the subject matter of the invention, comprises a support indicated generally by the reference character 6, the support comprising bars 7 and 8 respectively, which bars have their outer ends pointed at 9, so that they may be embedded in the material of which the head is formed, providing a support for the bars.

As clearly shown by the drawings, the bar 8 is formed with spaced ears 10 between which the gear 11 is mounted, the gear 11 being formed at the inner end of the lever 12 so that movement of the lever will result in a relative movement of the gear 11.

The teeth of the gear 11 mesh with teeth 13 that are formed on the bar 7, whereby the bars 7 and 8 may be moved towards and away from each other for purposes to be hereinafter more fully described.

These bars 7 and 8 are held in slidable relation with respect to each other, by means of the securing member 14, which is in the form of a bar provided with openings 15 for the reception of plastic material, which secures the securing member 14 to the doll head.

This securing member 14 is provided with laterally extended arms 16 that have flanges 17 extending therefrom, the flanges overlying the bars 7 and 8, holding the bars in slidable relation with each other, and at the same time fastening the bars to the securing member 14. It will of course be understood that the frictional contact between the flanges 17 and the bars 7 and 8, will be sufficient to hold the bars 7 and 8 against movement with respect to each other, under normal conditions, or after an adjustment of the bars 7 and 8 has been made.

Supported by the securing member 14 is a shaft 18, which shaft is adapted to rotate within openings of the securing member. The shaft 18 is of a length so that the ends thereof extend to points near the ends of the bars 7 and 8, where they provide supports for the eye members or shells 19.

Mounted on the shaft 18, near the ends thereof, are connecting members 20, each connecting member including a vertical bar 21 formed with reduced ends, and forwardly extended ears 22, the ears 22 being formed with square openings to receive the square shaft 18. Thus it will be seen that these connecting members 20 move with the shaft 18.

The eye members 19 are mounted on the reduced ends of the connecting members 20, and each eye member comprises a body portion and rearwardly extended arms 23 and 24, the arms 24 being longer than the arms 23 so that they extend rearwardly appreciable distances beyond the support 6, where they are connected by the bar 25 including laterally adjustable sections held together by the flanges 25' that form a part of the support for the weight 26.

The arms 23 and 24 are provided with openings to receive the ends of the connecting members, supporting the eye members for movement in horizontal planes.

The eye members will, of course, be permitted to rotate vertically, by movement of the shaft 18, within its bearings. Formed integral with the shaft 18 at a point intermediate the ends thereof, is a stop member 27, that has its ends extended above and below the support 6, to engage the securing member 14 and restrict vertical movement of the eye members to the end that the eye members will not move too far. This stop may be adjusted by bending the ends thereof, whereby the vertical movement of the eye members may be regulated.

In the modified form of the invention as illustrated by Figures 5 and 6 of the drawings, the device comprises bars 28 and 29 which are held together by means of the flanges 30 that form a part of the securing device 31, the flanges being bent around the overlapping portions of the bars 28 and 29, where they are clamped into close engagement with the bars, securing the bars against lateral movement with respect to each other. This securing device 31 is also formed with openings 32 to accommodate plastic material for securing the device within the doll head.

The reference character 33 designates a shaft, square in cross section, which is fitted in openings of the securing device 31 and mounted in such a way that the shaft may rotate within the openings. At the outer ends of the shaft 33, are supports or connecting members 34 that rotate with the shaft, the supports or connecting members having reduced ends 35 that fit within openings formed in the arms 36 and 37 of the eye members 38, supporting the eye members for pivotal movement in a horizontal plane.

The arms 37 are longer than the arms 36 and are connected by means of the bar 39 that provides a support for the weight 40.

A stop member, indicated by the reference character 35', is mounted on the shaft 33, the ends thereof adapted to engage the securing device 31 restricting movement of the shaft 33.

In the form of the invention as shown by Figure 7 of the drawings, the support comprises bars 41 and 42, which bars have right-angled inner ends 43, one of the right-angled inner ends being formed with a slot to accommodate the adjacent bar, permitting the bars to slide laterally with respect to each other. The bar 42 is formed with flanges 44, that are adapted to be bent over the bar 41, securing the bars 41 and 42 together.

The right-angled inner ends of the bars 41 and 42 are formed with openings to accommodate the shaft 45 that rotates freely within the openings, the shaft being square in cross section.

The eye members indicated by the reference character 46, are of a construction similar to the eye members previously described, and are formed with rearwardly extended arms 47 and 48 that have openings to receive the reduced ends of the connecting members 49 pivotally mounting the eye members for lateral pivotal movement.

The arms 48 are pivotally connected with the bar 50 that embodies members formed with elongated openings that accommodate the securing pin 51 of the weight 52, thereby adjustably mounting the weight to insure a true balance of the device.

As shown by Figure 12, the supporting device comprises bars 53 that are mounted one over the other and slide with respect to each other, the ends of the bars being formed at right-angles as at 54 so that they may be secured within the head of the doll.

The eye members, in this form of the invention, are indicated at 55 and are mounted for pivotal movement in a horizontal plane, by means of the connecting members 56, which connecting members are formed with square openings to receive the square shaft 57 that has pivotal movement within bearings that form a part of the securing device. Thus it will be seen that due to this construction, the eye members 55 may pivot vertically.

The reference character 58 designates an arm that has its upper end curved at 59, to engage the member 60 of the connecting device, restricting movement of the arm 58, in one direction.

The arm 58 is provided with a member 61 that has a square opening to receive the square shaft 57, whereby the arm 58 moves with the shaft 57.

A stop 62 is also connected with the arm 58 and curves forwardly, to engage the member 60 restricting movement of the arm in the opposite direction.

The arm 58 is moved by the weight 63 that is connected to the free end of the arm 58, moving the arm by gravity.

The reference character 64 designates an arm which supports the weight 65, the arm being formed integral with the shaft 66 that provides a support for the eye members 67, the eye members 67 being mounted on the shaft 66, through the medium of the connecting members 68.

Secured to the arm 64, are stops 69 and 70, the stop 69 adapted to engage the bar 71 of the securing device when the weight moves in one direction, while the stop 70 engages the bar 71 when the arm 64 moves in the opposite direction.

In the form of the invention as shown by Figures 14 and 15, an eyelid is indicated by the reference character 72, which eyelid is supplied with eyelashes 73. The eyelid 72 is provided with a rearwardly extended arm 74 formed with downwardly extended integral arms 75 that have square openings to receive the square shaft 76 forming a part of the eye mounting. Connected with this shaft 76, is a connecting member 77 that has reduced ends fitted in openings formed in the arms 78 of the eye member, thereby providing means for pivotally connecting the eye members 79 in a horizontal plane, lending a glancing appearance to the doll equipped with the device.

In this form of the invention, the eyelid 72 will move to a position to close the eye openings, when the doll is placed in a lying position, and the eye members 79 will move laterally when the doll is tilted laterally.

Figure 10 illustrates an eye member 80 formed with openings that are square to accommodate square pintles 81 carried at the ends of the connecting member 82 which includes rearwardly extended flanges 83 formed with square openings 84 in which a square movable shaft is positioned, whereby the eye members may move vertically as the shaft moves.

In Figure 11, the eye member 85 is formed with extensions 86 that have substantially square openings to receive the square shaft 87, which shaft provides a support for the eye members constructed in accordance with this form of the invention, and permits the eye members to move to simulate closed eyes, as in sleeping.

It will, of course, be understood that the shaft 87 is controlled in a manner similar to the corresponding shafts shown in the remaining figures of the drawings.

I claim:

1. The combination with a doll head having eye sockets, of an eye mounting comprising supporting bars having forwardly extended ends formed with bearing openings, connecting members, spaced ears extending rearwardly from each connecting member and having openings, a shaft square in cross section extending through the openings of the ears and forwardly extended ends of the supporting bars, upper and lower pintles forming a part of each connecting member, eye members fitted within the eye sockets, upper and lower rearwardly extended arms formed integral with the eye members, said arms being mounted upon said pintles, the lower arms being substantially long, bars connecting the substantially long arms, and a weight mounted intermediate the ends of the bars connecting the substantially long arms.

2. The combination with a doll head having eye sockets, of an eye mounting comprising supporting bars having forwardly extended ears at the ends thereof, said ears having openings, connecting members, pairs of spaced ears extending rearwardly from each connecting member and having square openings, a shaft substantially square in cross section, extending through the square openings of the ears, the ends of the shaft extending appreciable distances beyond the latter ears, upper and lower pintles formed on the connecting members, eye pieces positioned in the eye sockets, upper and lower arms extending rearwardly from said eye pieces, said arms being mounted upon said pintles, the lower arms being substantially long, an adjustable bar connected with the substantially long arms, and a weight mounted intermediate the ends of the adjustable bar and adapted to swing the eye members laterally when the doll head is tilted laterally, and said weight adapted to tilt the eye members vertically, when the doll head is tilted forwardly or rearwardly.

JOSEPH A. MANNING.